(12) United States Patent
Loane et al.

(10) Patent No.: US 11,213,740 B1
(45) Date of Patent: Jan. 4, 2022

(54) HYBRID CARD GAME APPARATUS

(71) Applicants: Stephen John Loane, Dublin (IE); Eoghan Brian Breslin, Orlando, FL (US)

(72) Inventors: Stephen John Loane, Dublin (IE); Eoghan Brian Breslin, Orlando, FL (US)

(*) Notice: Subject to any disclaimer, the term of this patent is extended or adjusted under 35 U.S.C. 154(b) by 0 days.

(21) Appl. No.: 17/004,672

(22) Filed: Aug. 27, 2020

(51) Int. Cl.
| | |
|---|---|
| *A63F 1/06* | (2006.01) |
| *G06K 7/10* | (2006.01) |
| *A63F 1/02* | (2006.01) |
| *A63F 1/00* | (2006.01) |

(52) U.S. Cl.
CPC ............ *A63F 1/067* (2013.01); *A63F 1/02* (2013.01); *A63F 2001/005* (2013.01); *G06K 2007/10504* (2013.01)

(58) Field of Classification Search
None
See application file for complete search history.

(56) References Cited

U.S. PATENT DOCUMENTS

| | | | | |
|---|---|---|---|---|
| 5,390,934 | A * | 2/1995 | Grassa | A63F 3/00157 273/274 |
| 7,727,060 | B2 | 6/2010 | Mills | |
| 2009/0062003 | A1* | 3/2009 | Kerscher | A63F 1/18 463/36 |
| 2010/0105460 | A1* | 4/2010 | Makhoul | G07F 17/3293 463/13 |
| 2012/0112412 | A1* | 5/2012 | Esposito | G07F 17/326 273/292 |
| 2020/0320820 | A1* | 10/2020 | Bros | A63F 3/00157 |

* cited by examiner

Primary Examiner — Robert T Clarke, Jr.
(74) Attorney, Agent, or Firm — Millman IP Inc.

(57) ABSTRACT

A hybrid card game apparatus is provided. The apparatus includes a playing surface having a set of card hand stations on which playing cards can be positioned, the set of card hand stations being distributed around a dealer position at a side edge of the playing surface, wherein a distance between the dealer position and a nearest edge of each of the set of card hand stations is at most 36 inches, a card sensor system positioned near each of the set of card hand stations to sense an identity of the playing cards positioned face down on the card hand station and generate card identification data enabling identification of the playing cards positioned on the card hand station. At least one network interface is connected to the card sensor systems and configured to transmit at least one of the card identification data and an identification of the playing cards.

11 Claims, 7 Drawing Sheets

HYBRID CARD GAME APPARATUS

FIELD

The specification relates generally to games and, in particular, to a hybrid card game apparatus.

BACKGROUND OF THE DISCLOSURE

The playing of card games such as poker is traditionally done with a dealer that deals playing cards, referred to as a card hand, to each of a set of players about a table. The players are preferably spaced apart about the periphery of the table to provide sufficient room for each player to privately view their face-down cards on the table without allowing other players to see their hand. Preferably, each player has ample room to rest their forearms on the table and adjust or bet with their chips, where wagering is provided.

More recently, in the last 25 or so years, with the advent of the Internet, online card games have become ubiquitous. A game hosting service includes one or more computers to which a group of players connect, and which provide a user interface through which to play and maintain state information for each player, including the playing cards in the player's card hand and the value of the player's chips. Additionally, the cards dealt to each player and held centrally, such as the face-up cards played by the dealer in Texas Hold'em poker, are randomly selected by the computers. As the outcomes of playing such card games online via such services are at least partially determined by the cards dealt, it can make some players uneasy to simply rely on the randomness of the cards selected by the computers.

SUMMARY OF THE DISCLOSURE

In one aspect, there is provided a hybrid card game apparatus, comprising: a playing surface having at least three card hand stations on which playing cards for players other than the dealer can be positioned, the at least three card hand stations being distributed around a dealer position along a side edge of the playing surface, the at least three card hand stations including a leftward card hand station and a rightward card hand station being positioned closest to a plane that is parallel to the side edge of the playing surface at the dealer position on a left side and a right side respectively of a dealer when the dealer is positioned adjacent to the dealer position and facing the playing surface, and at least one other card hand station, wherein a distance between the dealer position and a nearest edge of each of the at least one other card hand station is at most 36 inches, wherein the playing surface is configured to receive a card sensor system positioned near each of the at least three card hand stations to sense an identity of the playing cards positioned face down on the card hand station and generate card identification data enabling identification of the playing cards positioned on the card hand station.

The hybrid card game apparatus can further include the card sensor system positioned near each of the at least three card hand stations.

The hybrid card game apparatus can further include at least one network interface connected to the card sensor systems and configured to transmit at least one of the card identification data and an identification of the playing cards positioned on each of the at least three card hand stations generated from the card identification data over a data communications network.

The distance between the dealer position and the nearest edge of each of the at least one other card hand station can be at most 33 inches. The distance between the dealer position and the nearest edge of each of the at least one other card hand station can be at most 30 inches. The distance between the dealer position and the nearest edge of each of the at least one other card hand station can be at most 27 inches.

Each of the at least three card hand stations can include an at least partially transparent region in the table top, wherein the card sensor system of each of the set of card hand stations includes an imaging device positioned to image the playing cards positioned on the at least partially transparent region, and wherein the card identification data includes image data generated by the imaging device. The hybrid card game apparatus can further include at least one controller connected to the card sensor system of each of the at least three card hand stations and configured to recognize the identity of the playing cards positioned on each of the at least three card hand stations from the image data generated by the imaging device of each of the at least three card hand stations.

The playing surface can include a raised rear edge adjacent to each of the at least three card hand stations and distal from the dealer position to inhibit sliding travel of the playing cards beyond the card hand station.

The table top can include a recess in the side edge thereof in which the dealer position is located.

The hybrid card game apparatus can further include at least one table top extension connectible or connected to the table top, the at least one table top extension being configurable between a collapsed configuration in which the at least one table top extension does not extend along a plane of the table top, and an extended configuration in which the at least one table top extension extends along a plane of the table top.

The hybrid card game apparatus can further include a collapsible table support structure connectible or connected to the table top and configurable between a use configuration, in which the collapsible table support structure is connected to the table top and extends away therefrom to support the table top at an operational height relative to a floor surface, and a collapsed configuration, in which the collapsible table support structure is at least one of disconnected from the table top and does not extend away from the table top sufficiently to support the table top at the operational height.

The card sensor system of each of the at least three card hand stations can include a radio-frequency identification ("RFID") reader configured to read an RFID tag in each of the playing cards positioned on the card hand station.

The at least three card hand stations can be at least eight inches from the dealer position.

The at least three card hand stations can be distributed in an arc.

The playing surface can be a flexible mat.

The playing surface can include at least one rigid playing surface panel. The at least one playing surface panel can be at least two rigid playing surface panels. The at least two rigid playing surface panels can be connected together to enable articulation of the at least two rigid playing surface panel relative to one another.

In another aspect, there is provided a hybrid card game apparatus, comprising: a playing surface having at least three card hand stations on which playing cards for players other than the dealer can be positioned, the card hand stations being distributed around a dealer position along a side edge of the playing surface, wherein a distance between the dealer position and a nearest edge of each of the card hand stations is at most 36 inches, the playing surface being configured to receive a card sensor system positioned near each of the card hand stations to sense an identity of the playing cards positioned face down on the card hand station and generate card identification data enabling identification of the playing cards positioned on the card hand station.

The hybrid card game apparatus can further include the card sensor system positioned near each of the at least three card hand stations.

The hybrid card game apparatus can further include at least one network interface connected to the card sensor systems and configured to transmit at least one of the card identification data and an identification of the playing cards positioned on each of the at least three card hand stations generated from the card identification data over a data communications network.

The distance between the dealer position and the nearest edge of each of the at least three card hand stations can be at most 33 inches. The distance between the dealer position and the nearest edge of each of the at least three card hand stations can be at most 30 inches. The distance between the dealer position and the nearest edge of each of the at least three card hand stations can be at most 27 inches.

Each of the at least three card hand stations can include an at least partially transparent region in the table top, wherein the card sensor system of each of the set of card hand stations includes an imaging device positioned to image the playing cards positioned on the at least partially transparent region, and wherein the card identification data includes image data generated by the imaging device. The hybrid card game apparatus can further include at least one controller connected to the card sensor system of each of the at least three card hand stations and configured to recognize the identity of the playing cards positioned on each of the at least three card hand stations from the image data generated by the imaging device of each of the at least three card hand stations.

The playing surface can include a raised rear edge adjacent to each of the at least three card hand stations and distal from the dealer position to inhibit sliding travel of the playing cards beyond the card hand station.

The table top can include a recess in the side edge thereof in which the dealer position is located.

The hybrid card game apparatus can further include at least one table top extension connectible or connected to the table top, the at least one table top extension being configurable between a collapsed configuration in which the at least one table top extension does not extend along a plane of the table top, and an extended configuration in which the at least one table top extension extends along a plane of the table top.

The hybrid card game apparatus can further include a collapsible table support structure connectible or connected to the table top and configurable between a use configuration, in which the collapsible table support structure is connected to the table top and extends away therefrom to support the table top at an operational height relative to a floor surface, and a collapsed configuration, in which the collapsible table support structure is at least one of disconnected from the table top and does not extend away from the table top sufficiently to support the table top at the operational height.

The card sensor system of each of the at least three card hand stations can include a radio-frequency identification ("RFID") reader configured to read an RFID tag in each of the playing cards positioned on the card hand station.

The at least three card hand stations can be at least eight inches from the dealer position.

The at least three card hand stations can be distributed in an arc.

The playing surface can be a flexible mat.

The playing surface can include at least one rigid playing surface panel. The at least one playing surface panel can be at least two rigid playing surface panels. The at least two rigid playing surface panels can be connected together to enable articulation of the at least two rigid playing surface panel relative to one another.

In a further aspect, there is provided a hybrid card game apparatus, comprising: a playing surface having at least three card hand stations on which playing cards for players other than the dealer can be positioned, the at least three card hand stations being distributed around a dealer position along a side edge of the playing surface, the at least three card hand stations including a leftward card hand station and a rightward card hand station being positioned closest to a plane that is parallel to the side edge of the playing surface at the dealer position on a left side and a right side respectively of a dealer when the dealer is positioned adjacent to the dealer position and facing the playing surface, and at least one other card hand station, wherein a distance between the dealer position and a nearest edge of each of the at least one other card hand station is at most 36 inches, and a card sensor system positioned near each of the at least three card hand stations to sense an identity of the playing cards positioned face down on the card hand station and generate card identification data enabling identification of the playing cards positioned on the card hand station.

The hybrid card game apparatus can further include the card sensor system positioned near each of the at least three card hand stations.

The hybrid card game apparatus can further include at least one network interface connected to the card sensor systems and configured to transmit at least one of the card identification data and an identification of the playing cards positioned on each of the at least three card hand stations generated from the card identification data over a data communications network.

The distance between the dealer position and the nearest edge of each of the at least one other card hand station can be at most 33 inches. The distance between the dealer position and the nearest edge of each of the at least one other card hand station can be at most 30 inches. The distance between the dealer position and the nearest edge of each of the at least one other card hand station can be at most 27 inches.

Each of the at least three card hand stations can include an at least partially transparent region in the table top, wherein the card sensor system of each of the set of card hand stations includes an imaging device positioned to image the playing cards positioned on the at least partially transparent region, and wherein the card identification data includes image data generated by the imaging device. The hybrid card game apparatus can further include at least one controller connected to the card sensor system of each of the at least three card hand stations and configured to recognize the identity of the playing cards positioned on each of the at least three card hand stations from the image data generated by the imaging device of each of the at least three card hand stations.

The playing surface can include a raised rear edge adjacent to each of the at least three card hand stations and distal from the dealer position to inhibit sliding travel of the playing cards beyond the card hand station.

The table top can include a recess in the side edge thereof in which the dealer position is located.

The hybrid card game apparatus can further include at least one table top extension connectible or connected to the table top, the at least one table top extension being configurable between a collapsed configuration in which the at least one table top extension does not extend along a plane of the table top, and an extended configuration in which the at least one table top extension extends along a plane of the table top.

The hybrid card game apparatus can further include a collapsible table support structure connectible or connected to the table top and configurable between a use configuration, in which the collapsible table support structure is connected to the table top and extends away therefrom to support the table top at an operational height relative to a floor surface, and a collapsed configuration, in which the collapsible table support structure is at least one of disconnected from the table top and does not extend away from the table top sufficiently to support the table top at the operational height.

The card sensor system of each of the at least three card hand stations can include a radio-frequency identification ("RFID") reader configured to read an RFID tag in each of the playing cards positioned on the card hand station.

The at least three card hand stations can be at least eight inches from the dealer position.

The at least three card hand stations can be distributed in an arc.

The playing surface can be a flexible mat.

The playing surface can include at least one rigid playing surface panel. The at least one playing surface panel can be at least two rigid playing surface panels. The at least two rigid playing surface panels can be connected together to enable articulation of the at least two rigid playing surface panel relative to one another.

Other technical advantages may become readily apparent to one of ordinary skill in the art after review of the following figures and description.

BRIEF DESCRIPTIONS OF THE DRAWINGS

For a better understanding of the embodiment(s) described herein and to show more clearly how the embodiment(s) may be carried into effect, reference will now be made, by way of example only, to the accompanying drawings in which.

Figure 1:
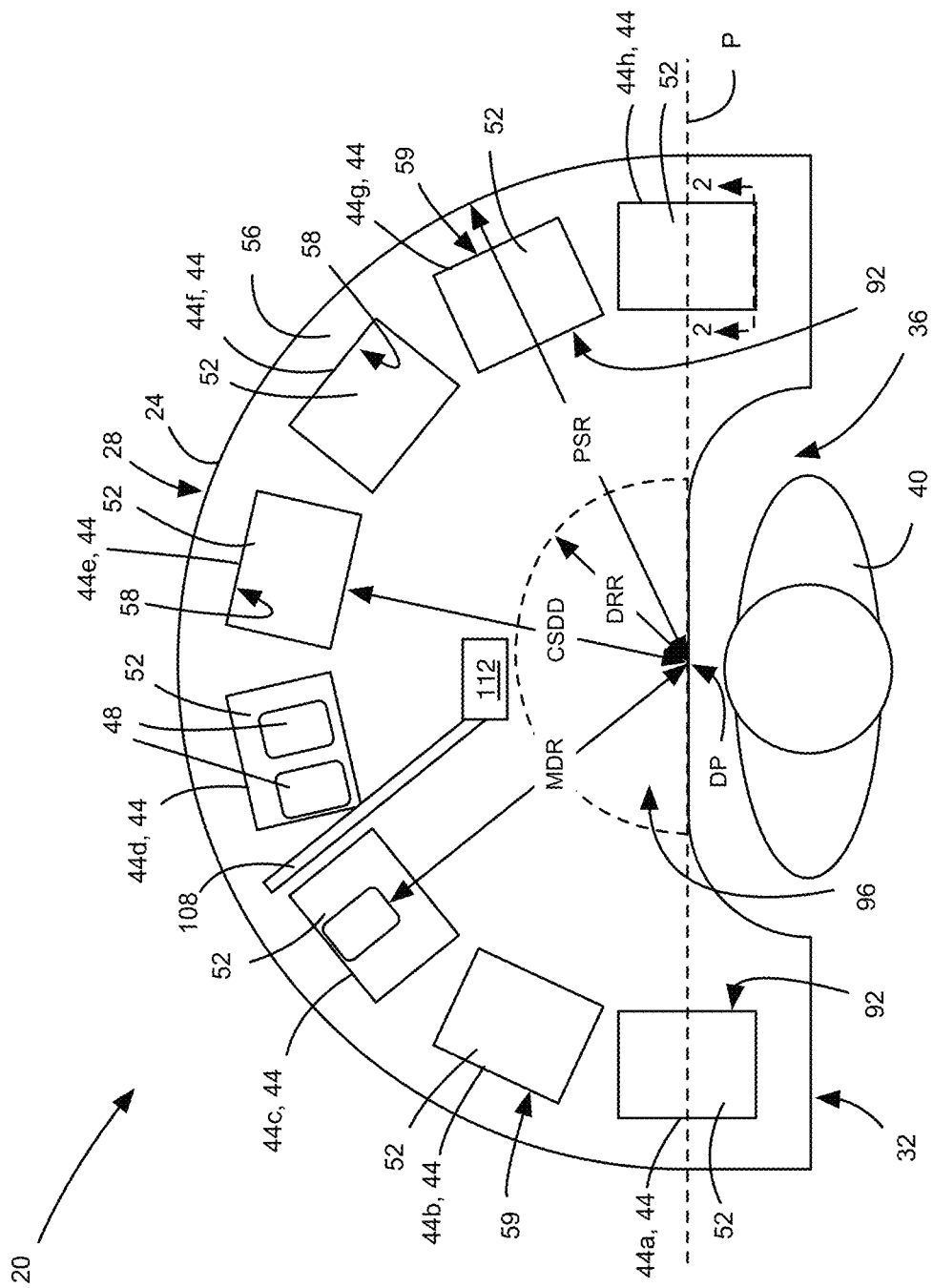
FIG. 1 shows a plan view of a hybrid card game table in accordance with one embodiment of the disclosure.

Unless otherwise specifically noted, articles depicted in the drawings are not necessarily drawn to scale.

DETAILED DESCRIPTION

For simplicity and clarity of illustration, where considered appropriate, reference numerals may be repeated among the Figures to indicate corresponding or analogous elements. In addition, numerous specific details are set forth in order to provide a thorough understanding of the embodiment or embodiments described herein. However, it will be understood by those of ordinary skill in the art that the embodiments described herein may be practiced without these specific details. In other instances, well-known methods, procedures and components have not been described in detail so as not to obscure the embodiments described herein. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description. It will also be noted that the use of the term "a" or "an" will be understood to denote "at least one" in all instances unless explicitly stated otherwise or unless it would be understood to be obvious that it must mean "one".

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Any module, unit, component, server, computer, terminal, engine or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Further, unless the context clearly indicates otherwise, any processor or controller set out herein may be implemented as a singular processor or as a plurality of processors. The plurality of processors may be arrayed or distributed, and any processing function referred to herein may be carried out by one or by a plurality of processors, even though a single processor may be exemplified. Any method, application or module herein described may be implemented using computer readable/executable instructions that may be stored or otherwise held by such computer readable media and executed by the one or more processors.

Recently, CoViD-19 has made physically meeting to play card games such as poker challenging. Online poker feels one dimensional to many players for a number of reasons. Players may not feel comfortable with the randomness of the cards dealt via a computer system. In addition, the interaction present between players during a poker game in which players are physically present is missing. For example, there is perceived skill and fun in reading one's opponents' body language to seek clues "tells" to glean information about the strength of their hand.

The solution proposed is a playing surface where a dealer physically adjacent to the playing surface actually shuffles real cards and deals them by hand. Card sensor systems are employed at card hand stations to obtain card identification data for face-down cards at each card hand station. Each player may only be able to receive the card identification data from the card hand station to which they have been assigned. It can also be advantageous to present one or more images of the playing surface during play to enable player verification that the cards appear to be dealt in a seemingly random manner, viewing of the chips available to or bet by each player and the pot, etc. Further, it can be desirable to present images, such as video, from other players to provide a level of interaction between players by streaming images of each player's face, torso, and hands just as would be visible during a game in which players are physically present.

As the playing surface is designed to be used with only the dealer physically present, the playing surface was tailored to facilitate use by the dealer with less consideration for the ability to host physically present players at the table. This is a departure from other solutions which focus on accommodating players that are physically present Various sizes and layouts were considered and tested, and it was concluded that, by placing card hand stations that are used to sense the identity of the face-down cards of each player within a set distance from a dealer position at the edge of the table, speed of play was increased, dealer comfort, and the reduction of repetitive strain injuries due to constant standing up and down and stretching at various angles. It is not unusual for a dealer to make approximately 58 movements of cards and chips during a normal hand. At a rate of about 27 hands per hour, serious fatigue and strains can occur. This was also congruous with the decrease in required size of the playing surface when it was expected that no players would likely be physically present, enabling the playing surface to be reduced in size to reduce room space requirements and facilitate storage. In some embodiments, the playing surface is essentially too small for physically present players and is essentially only for remote games.

A hybrid card game apparatus in accordance with an embodiment is shown in FIG. 1. For purposes of this discussion, hybrid card games are ones played with a physical set of cards, enabling verification of the physical cards being dealt by a person (i.e., the dealer) by remote players. While the hybrid card game apparatuses disclosed herein may be, in some cases, used with players that physically are positioned beside the apparatuses, the apparatuses are principally designed to facilitate the dealing of playing cards in a card game with remote players. Due to this shift in strategy away from the needs of physically present players, the hybrid card game apparatuses can primarily address the dealer experience. Better dealing efficiencies enabled by these hybrid card game apparatuses can enable a higher hand rate and, thus, a larger number of hands being dealt per hour than with state-of-the-art tables, particularly when players apart from the dealer are not physically present to return the cards towards the dealer.

The hybrid card game apparatus in this embodiment is a table 20 that has a playing surface in the form of a table top 24. The table top 24 is generally D- or U-shaped, having a generally round distal side edge 28, and a generally linear dealer-side edge 32. A recess 36 forming part of the dealer-side edge 32 enables a card dealer 40 (or, more simply, "dealer") to be positioned closer to a center of the table top 24 than if the dealer-side edge 32 did not have a recess.

The top of the table top 24 has a set of card hand stations 44a to 44h (alternatively referred to hereafter as card hand stations 44) on which playing cards 48 for players, either remote or physically present, other than the dealer can be positioned to sense an identity of playing cards 48 positioned face down thereon. In the illustrated embodiment, each of the card hand stations 44 is defined by an at least partially transparent region of the table top 24 provided by a glass panel 52 mounted in an aperture in a table frame 56 of the table top 24. The glass panels 52 are, in particular, transparent or slightly opaque panels that are mounted in apertures in the table frame 56. The table frame 56 can be made of any suitable material such as a pressboard material, a moulded plastic, a metal, wood, etc., and may be covered with a felt or other suitable material. In other embodiments, the glass panels 52 can be made of any other suitable material and the table top 24 may be made of a single panel of material that has at least partially transparent regions or is entirely at least partially transparent. In this latter case, the card hand stations may be identified using any identifying means, such as markings on the surface of the table top 24 or via the placement of a fabric such as a felt, in the other regions of playing surface.

The set of three or more card hand stations 44 are distributed around a dealer position DP along the dealer side edge 32 of the table top 24, within the recess 36. In a shown preferred configuration, the card hand stations 44 are positioned at regular angular intervals along an arc that curves around the dealer position DP. While, in the illustrated embodiment, the table top 24 has eight card hand stations 44, the playing surface can have as few as three and may have up to nine, ten, or more card hand stations.

In other embodiments, the card hand stations can be distributed in any suitable manner around the dealer position. For example, in one alternative embodiment, the card hand stations can be configured in two concentric arcs that curve around a dealer position, with the card hand stations of one of the arcs being angularly offset relative to the card hand stations of the other of the arcs.

Figure 2:
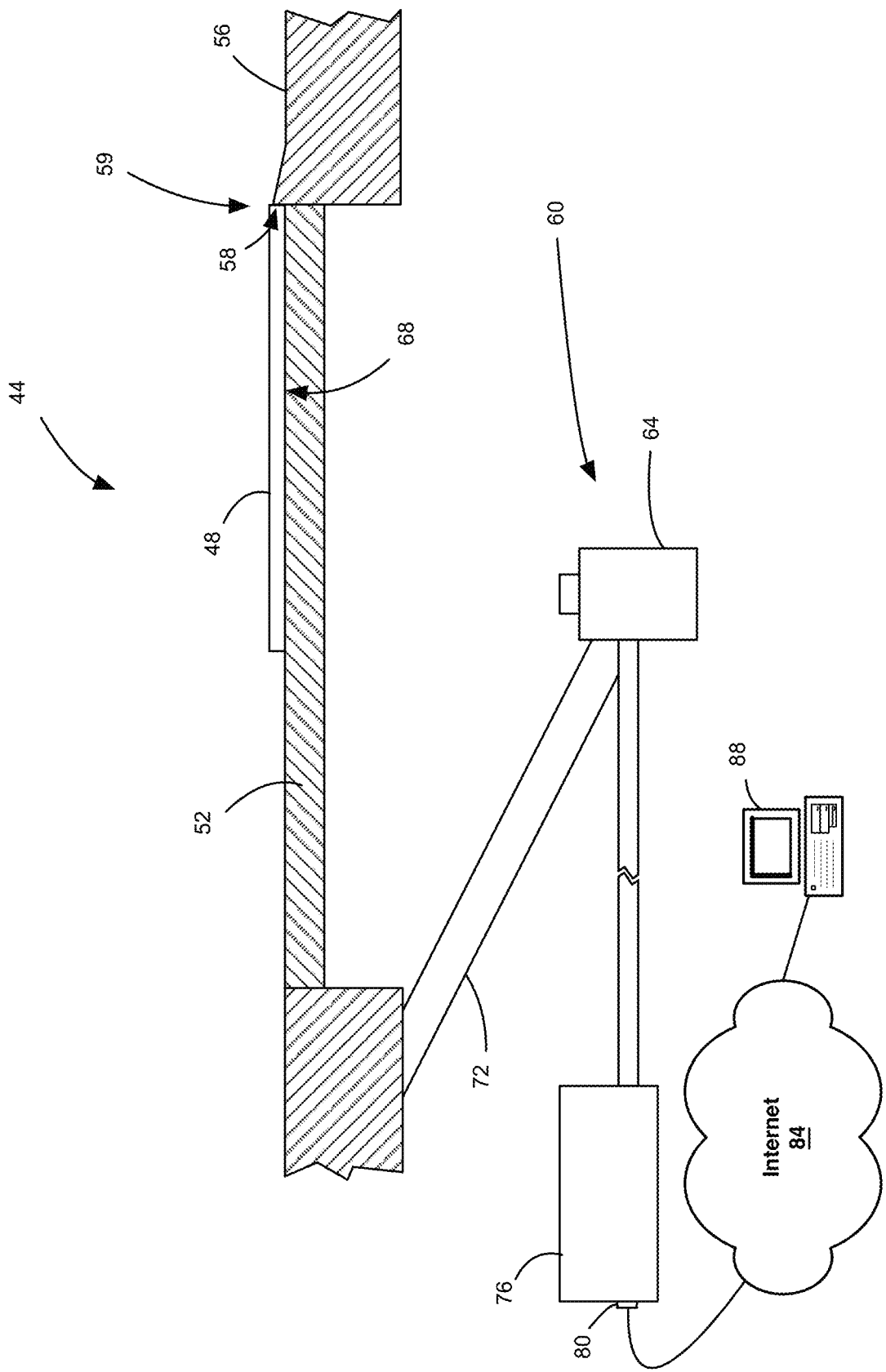
FIG. 2 is a partial section view along 2-2 in FIG. 1.

Now referring to FIGS. 1 and 2, each card hand station 44 includes a raised edge 58 adjacent to a far edge 59 of each of the set of card hand stations and distal from the dealer position DP to inhibit sliding travel of the playing cards 48 beyond the card hand station 44. The raised edge can be provided by a raised portion of the table frame 56, by recessing the glass panel towards its far edge 59 relative to the table frame 56, or via any another suitable design.

The table top 24 is configured to receive a card sensor system 60 positioned near each of the set of card hand stations 44 to sense an identity of the playing cards 48 positioned on the card hand station 44 and generate card identification data enabling identification of the playing cards 48 positioned on the card hand station 44. The card sensor system 60 in this embodiment includes an imaging device in the form of a video camera 64 positioned to capture a set of images of faces 68 of the cards 48 positioned on the card hand station 44 through the at least partially transparent glass panel 52. While, in this embodiment, a video camera is employed, any other type of imaging device, such as a still photo camera, can be used. The video camera 64 is positioned relative to the glass panel 52 and, thus, the card hand station 44 via a camera support 72 so that the playing cards 48 can be positioned anywhere on the glass panel 52 defining the card hand station 44 and be imaged by the video camera 64. It will be understood that the playing cards 48 in this embodiment will need to at least partially not overlap so that card identifiers (e.g., the printed markings identifying the card as a 5 of clubs, etc.) can be imaged sufficiently by the video camera 64 to enable identification of the identity of the playing cards 48 positioned on the card hand station 44.

While, in this embodiment, the playing surface includes a camera support in the form of an arm, any sort of physical structure for receiving a card sensor system in proximity to each card hand station can be employed. In another particular embodiment, a shelf below the top surface of the table top can be provided upon which mobile phones with cameras can be positioned to image the playing cards positioned on the card hand stations through at least partially transparent regions of the playing surface.

The video camera 64 is configured to generate card identification data enabling identification of the playing cards 48 positioned on the card hand station 44. The card identification data includes image data generating by the video camera 64 and can be signals corresponding to image data in one example. In another example, the video camera 64 can be configured to perform optical recognition of the identity of the playing cards 48 via their card identifiers.

The card identification data or the identity of the playing card(s) 48 is transmitted by the video camera 64 either wirelessly or via a wired connection to a controller 76. The controller 76 is a single device or a combination of devices that act to control communication of the card identity data or the identity of the cards to the one or more remote player's computing devices. The controller 76 can be connected to a single card sensor system 60, two or more card sensor systems 60, or can be connected to all of the card sensor systems 60 at each card hand station 44. Where the card identification data generated by the video cameras 64 is video data, the controller 76 can be configured to downsample the video data from the one or more video cameras 64. The controller 76 includes a network interface 80 enabling the controller 76 to communicate the card identification data from the video camera(s) 64 over a data communications network, such as the Internet 84, to computing devices 88 operated by virtual players participating in the card game. Alternatively, the controller 76 can perform optical recognition on the card identification data to determine an identity of the playing cards 48 positioned on the card hand stations 44 and transmit the identity via the network interface 80 to the computing devices 88 used by players to play the hybrid card game. In another configuration, the controller 76 can communicate the identity of the cards determined by the video cameras 64 at each card hand station 44 to which it is connected to the computing devices 88. As will be appreciated, the hybrid card game apparatus can include a single controller connected to the card sensor system 60 at each card hand station 44, can include two or more controllers connected to subsets of the card sensor systems 60 at each of the card hand stations 44, etc. Where the identity of the playing cards 48 positioned on each card hand station 44 is determined by the video cameras 64 or the controller 76, the controller 76 can maintain this state information about the card game and/or communicate the state information to one or more other computers that are configured to maintain state information for the game. In some embodiments, the controller 76 can be a computing device such as a personal computer.

Each card hand station 44 is positioned so that a cross-surface dealing distance CSDD between the dealer position DP and a nearest edge 92 of each of the set of card hand stations 44 is at most 36 inches in a particularly preferred embodiment. It has been determined that this distance between the dealer position DP and the nearest edge 92 of each card hand station 44 enables efficient dealing for most human dealers. In order to accommodate a greater range of dimensions of dealers, it can be desirable to make this cross-surface dealing distance CSDD 33 inches at most. Still further, it can be desirable to make this cross-surface dealing distance CSDD 30 inches at most. Even further, it can be desirable to make this cross-surface dealing distance CSDD 27 inches at most. By controlling the cross-surface dealing distance CSDD that the dealer 40 would have to reach over in order to place or pick up the cards on the card hand stations 44, the dealer 40 can more quickly deal hands and thus increase the number of hands per hour that the dealer 40 can deal.

It has been determined that it may be easier for the dealer 40 to reach positions laterally, as the dealer 40 may not need to reach across the table and may more readily reach left and right. It has been found that repetitive strains are more prevalent when the dealer 40 has to reach at least partially across the playing surface. These lateral positions include a leftward card hand station 44a and a rightward card hand station 44h being positioned closest to or touching a plane P that is parallel to the dealer side edge 32 of the playing surface at the dealer position DP on a left side and a right side respectively of the dealer 40 when the dealer 40 is positioned adjacent to the dealer position DP and facing the playing surface. It is desirable that the distance between the dealer position DP and the nearest edge 92 of each of one or more card hand stations 44, other than the leftward card hand station 44a and the rightward card hand station 44h, is at most 36 inches to avoid dealer discomfort or repetitive strain, and to enable efficient operation of the card game being dealt.

In preferable configurations, the card hand stations 44 are sufficiently large to enable sensing of the identity of the face down playing cards 48, but sufficiently small to restrict travel of the playing cards 48 from the leading edge 92 thereof. The size of the card hand stations 44 can be varied depending on the number of playing cards 48 to be dealt to a player and the card sensor system being deployed. In order to ensure that the dealer 40 does not have to stretch uncomfortably or inefficiently, it may be desirable to restrict a maximum dealing reach MDR between the dealer position DP and a playing card 48 positioned against the rear edge 59 of each card hand station 36 to 38 inches at most.

It can be desirable for some card games to maintain a space free in front of the dealer 40 on the playing surface for undealt cards, a dealer's hand, etc. In Texas Hold'em poker, space may be desired for the "flop", the "turn", and the "river" cards that are placed face up on the playing surface. Thus, a dealer region 96 of the playing surface can be maintained to afford space for these items. In a preferred embodiment, the dealer region 96 extends a dealer region radius DRR at least eight inches from the dealer position DP. Accordingly, the nearest edges 92 of the card hand stations 44 are positioned at least eight inches from the dealer position DP. In other embodiments, the dealer region 96 can be dimensioned as a narrow band of the playing surface adjacent the dealer.

In addition, by limiting a playing surface radius PSR between the dealer position DP and the distal side edge 28 of the table top 24 to 45 inches at most, the table 20 can be suitable for use in smaller environments, or may be stored in a smaller space when not in use.

Now with reference to FIGS. 1 to 3A, a top view camera support 108 is affixed to the table top 24 and extends upwardly away from the table top 24 to support a top view camera 112. The top view camera 112 can be any type of imaging device, but is preferably a video camera capable of capturing and relaying video of a top view of the table top 24. The top view camera 112 is connected either via wire or wirelessly to the controller 76 and transmits a video data corresponding to the video images it captures to the controller 76. The controller 76 is configured to transmit the video images from the top view camera 112 to the computing devices 88 of remote players so that they can watch the cards being shuffled, the playing cards 48 being turned over at the end of a hand, etc.

Figure 3A:
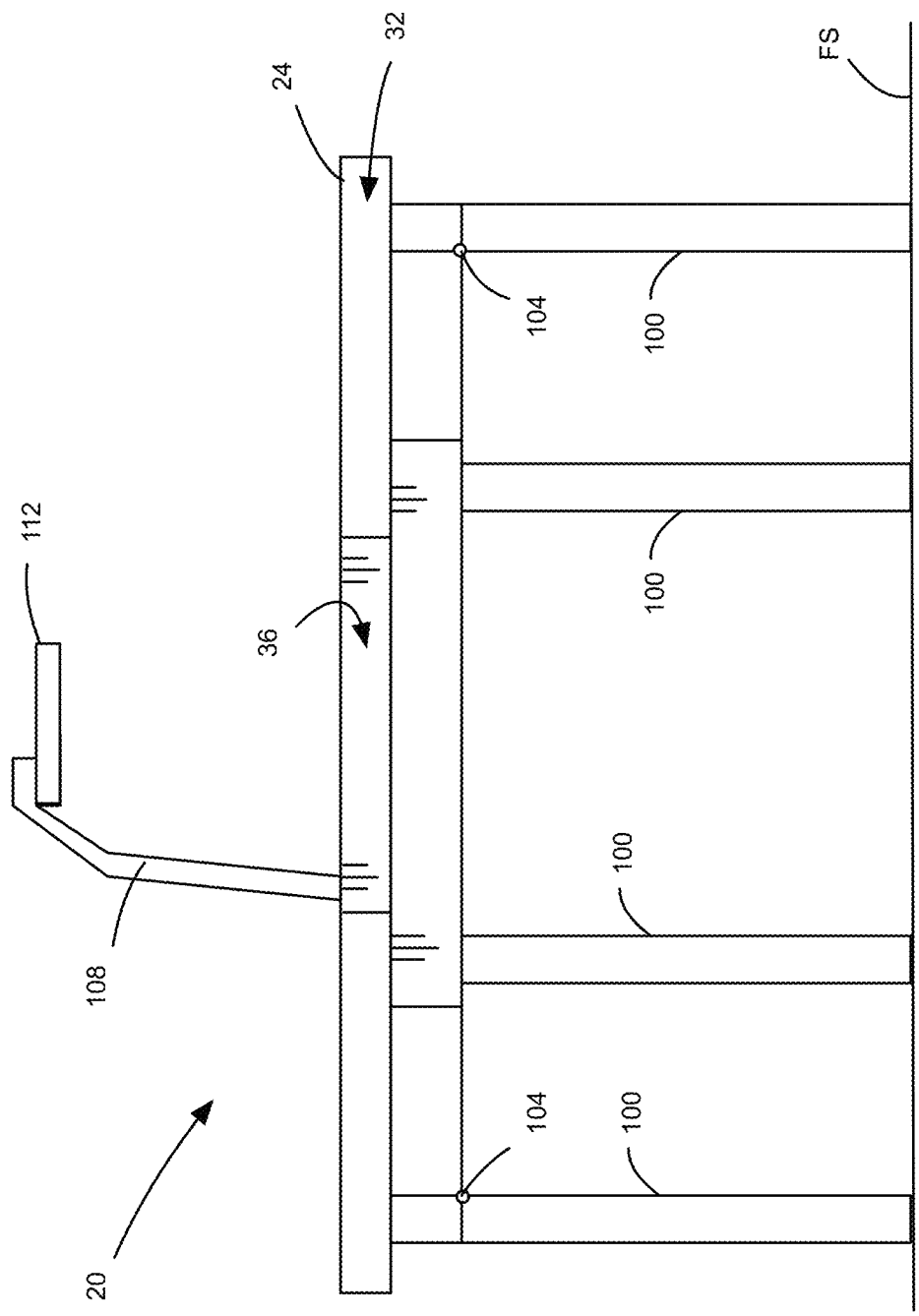
FIG. 3A is a side elevation view of the hybrid card game table of FIG. 1.
Figure 3B:
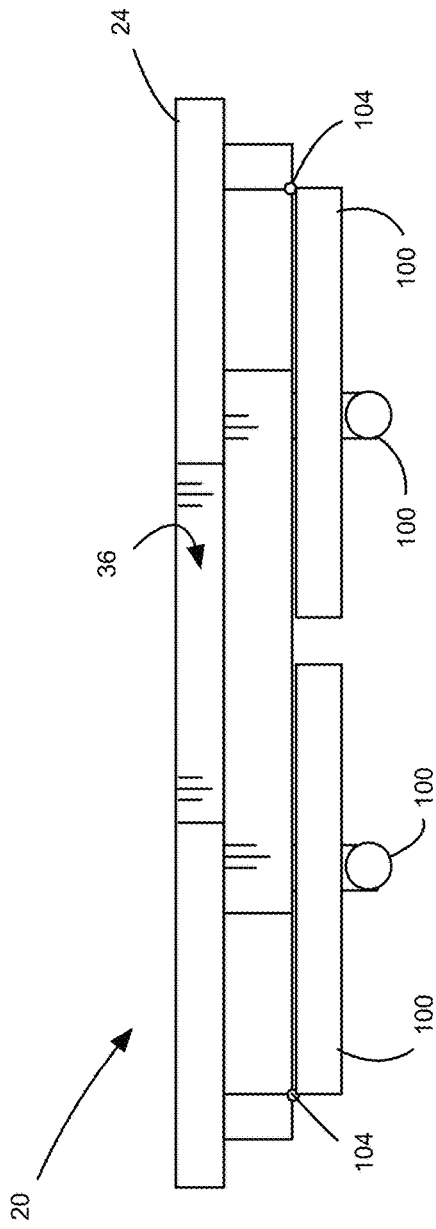
FIG. 3B shows the hybrid card game table of FIG. 3A in a collapsed configuration.

FIG. 3A shows the table 20 having a collapsible table support structure in the form of a set of four collapsible legs 100 that are connected via hinges 104. The legs 100 extend away from the table top 24 and support the table top 24 at an operational height relative to a floor surface FS in a use position. In a collapsed configuration shown in FIG. 3B, the legs 100 are pivoted about the hinges 104 and the top view camera support 108 has been disconnected from the table top 24 to make the table 20 compact for storage. In this configuration, the collapsible legs 100 do not extend away from the table top 24 sufficiently to support the table top at the operational height. In another embodiment, the collapsible table support structure can be disconnected from the table top to compact the table 20. In a compacted form, it can be positioned atop of a support, such as another table or desk, to be used.

Figure 4:
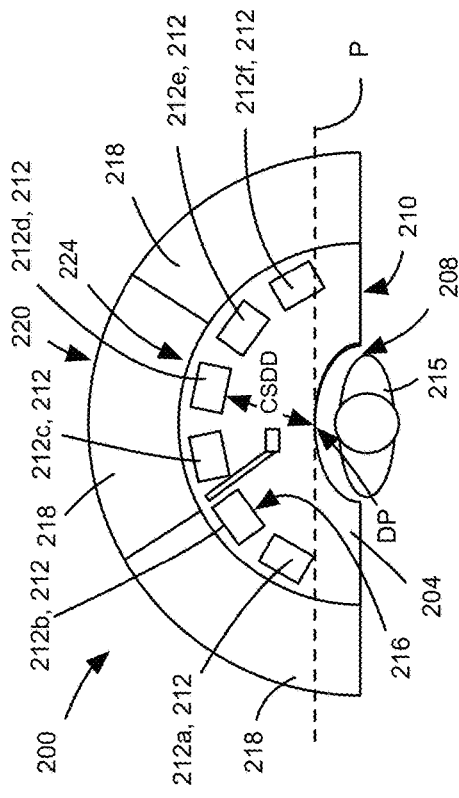
FIG. 4 shows a plan view of a hybrid card game table in accordance with another embodiment, wherein the table has table extensions.

FIG. 4 shows a hybrid card game apparatus in the form of a table 200 that includes a table top 204 generally similar in shape to the table 20 of FIG. 1. The table top 204 has a recess 208 along a dealer side edge 210 in which a dealer can be positioned to deal cards. A set of card hand stations 212a to 212f (alternatively referred to hereinafter as card hand stations 212) are distributed around a dealer position DP at the dealer side edge 210 within the recess 208. Lateral positions include a leftward card hand station 212a and a rightward card hand station 212f being positioned closest to or touching a plane P that is parallel to the dealer side edge 210 of the playing surface at the dealer position DP on a left side and a right side respectively of the dealer when a dealer 215 is positioned adjacent to the dealer position DP and facing the playing surface. It is desirable that the cross-surface dealing distance CSDD between the dealer position DP and a nearest edge 216 of each of one or more card hand stations 212, other than the leftward card hand station 212a and the rightward card hand station 212f, is at most 36 inches in one preferred embodiment to avoid dealer discomfort or repetitive strain, and to enable efficient operation of the card game being dealt. In order to accommodate a greater range of dimensions of dealers, it can be desirable to have this cross-surface dealing distance CSDD be 33 inches at most. Still further, it can be desirable to have this cross-surface dealing distance CSDD be 30 inches at most. Even further, it can be desirable to have this cross-surface dealing distance CSDD be 27 inches at most. By controlling the cross-surface dealing distance CSDD that the dealer 215 would have to reach over in order to place or pick up the cards on the card hand stations 212, the dealer 215 can more quickly deal hands and thus increase the number of hands per hour that the dealer 215 can deal.

A set of three of table top extensions 218 are connected to the table top 204 and extend along a plane of the table top 204 in an extended configuration as is shown. In the extended configuration, players can sit around a distal outer edge 220 of the table top extensions 218. In one envisioned scenario, in this extended configuration, a dealer can deal to one or more players positioned at the distal outer edge 220 of the table top 204 and one or more remote players using the card hand stations 212 to provide the remote players visual images of the face-down playing cards in their hands. In this manner, the table top 204 can be adapted to accommodate both physically present and remote players.

These table top extensions 218 can be alternatively configured in a collapsed configuration, in which the table top extensions 218 do not extend along a plane of the table top 204. In one embodiment, the table top extensions 218 are hingedly connected to the table top 204 and pivot downwards. The collapsed configuration can be employed when no players will be positioned around the distal outer edge 220 of the table top 204. As no players will be sitting at the table 200, there is no need to provide leg room around a distal side edge 224 of the table top 204. In the collapsed configuration, the table 200 has a smaller length and width, making it more suitable for use in smaller spaces. In another embodiment, the table top extensions 218 can be detached from the table top 204 and stored, and then re-attached to provide the extended configuration of the table 200 when needed.

Figure 5:
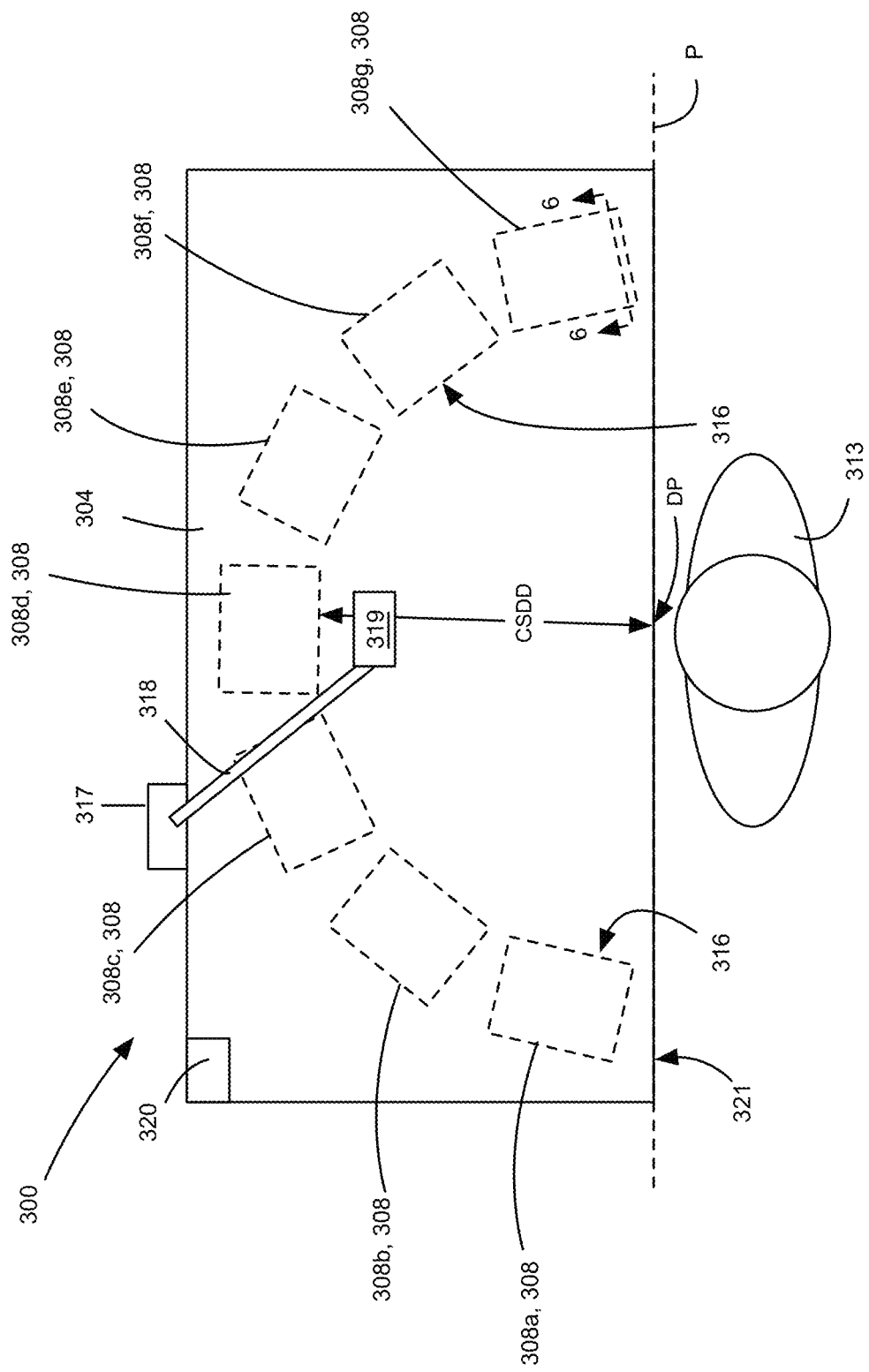
FIG. 5 shows a plan view of a hybrid card game mat in accordance with a further embodiment of the disclosure.

FIG. 5 shows a hybrid card game apparatus in accordance with a further embodiment, wherein the apparatus is a mat system 300. The mat system 300 includes a playing surface in the form of a mat 304 that is generally flexible or bendable. In a preferred configuration, the mat 304 has a foamed polyvinyl chloride (PVC) or rubber base over which is positioned a polyester fabric surface. The mat 304 is made for use with a table or desk and can be positioned atop of the top thereof. The foamed PVC or rubber provides good traction on a table or desk surface atop of which it is placed. The polyester fabric surface enables sliding travel of playing cards thereover. The mat 304 can alternatively be made of various other materials. While the mat 304 is this embodiment has a rectangular shape, it will be appreciated that the mat 304 can be made in a variety of shapes that accommodate the features described hereinbelow.

The mat 304 includes a set of seven card hand stations 308a to 308g (alternatively referred to hereinafter as card hand stations 308) that are distributed around a dealer position DP at a side edge 321 of the mat 304. Lateral positions include a leftward card hand station 308a and a rightward card hand station 308g being positioned closest to or touching a plane P that is parallel to the dealer side edge 321 of the playing surface at the dealer position DP on a left side and a right side respectively of a dealer 313 when a dealer 313 is positioned adjacent to the dealer position DP and facing the playing surface. It is desirable that the cross-surface dealing distance CSDD between the dealer position DP and a nearest edge 316 of each of one or more card hand stations 308, other than the leftward card hand station 308a and the rightward card hand station 308g, is at most 36 inches in a preferred embodiment to avoid dealer discomfort or repetitive strain, and to enable efficient operation of the card game being dealt. In order to accommodate a greater range of dimensions of dealers, it can be desirable to have this cross-surface dealing distance CSDD be 33 inches at most. Still further, it can be desirable to have this cross-surface dealing distance CSDD be 30 inches at most. Even further, it can be desirable to have this cross-surface dealing distance CSDD be 27 inches at most. By controlling the cross-surface dealing distance CSDD that the dealer 313 would have to reach over in order to place or pick up the cards on the card hand stations 308, the dealer 313 can more quickly deal hands and thus increase the number of hands per hour that the dealer 313 can deal.

Figure 6:
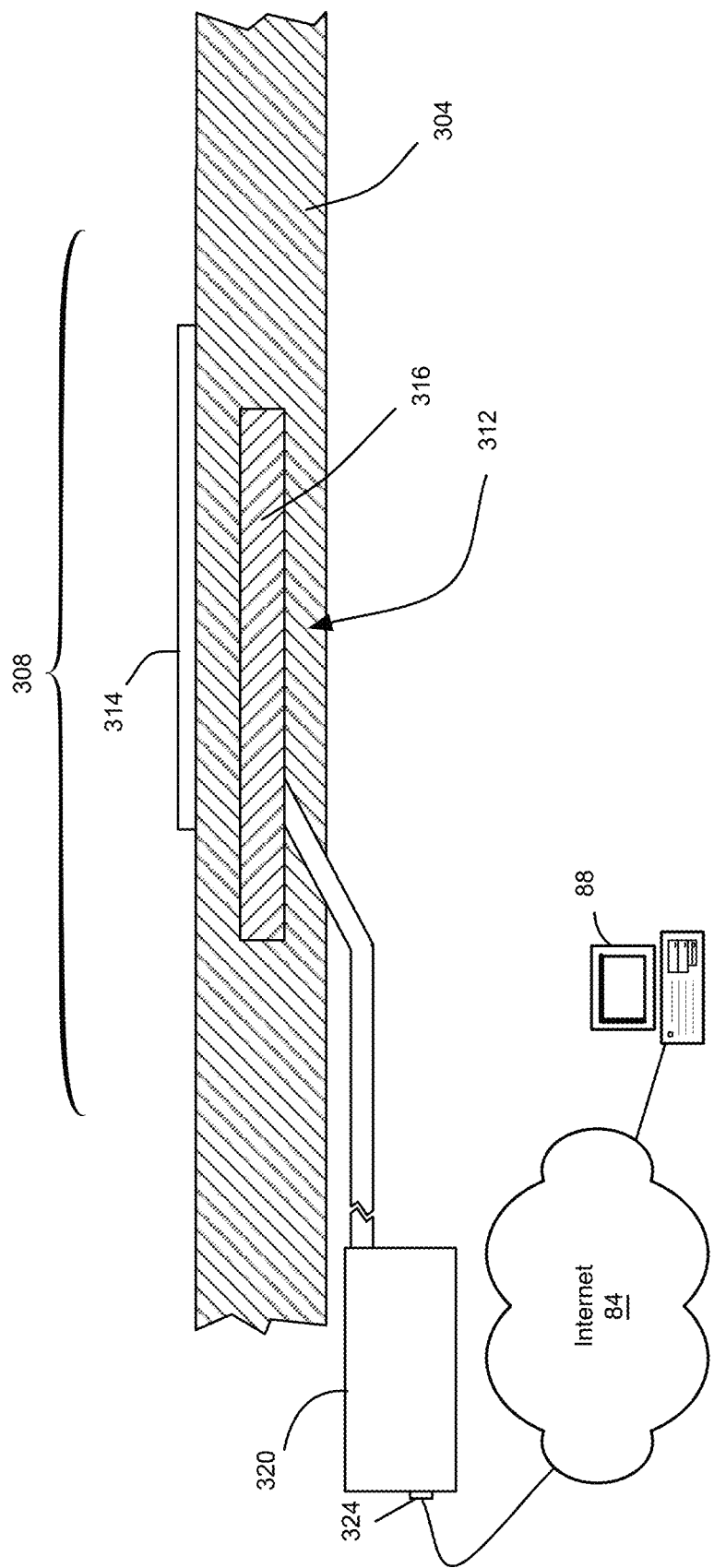
FIG. 6 is a partial section view along 6-6 in FIG. 5.

Now referring to FIGS. 5 and 6, the mat 304 has a card sensor system 312 received within a recess and positioned near each of the set of card hand stations 308 to sense an identity of playing cards 314 positioned face down on the card hand station 308 and generate card identification data enabling identification of the playing cards 314 positioned on the card hand station 308. The card sensor system 312 includes a radio-frequency identification (RFID) reader 316 that is embedded in, positioned within a recess of the mat 304. The RFID reader 316 is configured to read an RFID tag in each playing card 314 placed on the card hand station 308. The RFID tag of each playing card is coded with an identifier corresponding to the identity of the playing card 314 shown on its face. The range of the RFID reader 316 is configured to read the RFID tags of playing cards 314 positioned on the card hand station 308 associated with (that is, positioned above) the RFID reader 316, and not read the RFID tags of playing cards 314 positioned on other card hand stations 308. The RFID reader 316 can be configured to determine an identity of the playing cards 314 on the card hand station 308 from the data received from the RFID tags thereof. It will be understood that, in this embodiment, the RFID reader 316 can read the RFID tags of two playing cards that are positioned separately, overlapping, or one directly atop of the other on the card hand station 308. A planar camera support base 317 can be positioned under the mat 304 and has a camera support arm 318 that holds a camera 319 above the mat 304 to generate images of the entire playing surface.

The RFID reader 316 and the camera 319 are connected via wires or wirelessly to a controller 320 and transmits a signal corresponding with the card identification data received from the RFID tag or the identity of the card determined by the RFID reader 316. The controller 320 may be connected to a single RFID reader 316 or to some or all of the RFID readers 316 for the card hand stations 308 of the mat 304. If card identity data is received from the RFID readers 316, the controller 320 can determine the identity of the playing cards from a local reference table or via a query to a device having the reference table. The controller 320 has a network interface 324 and is configured to transmit the identity of the playing cards 314 associated with each remote player to their respective computing device 88 over a data communications network such as the Internet 84.

Figure 7:
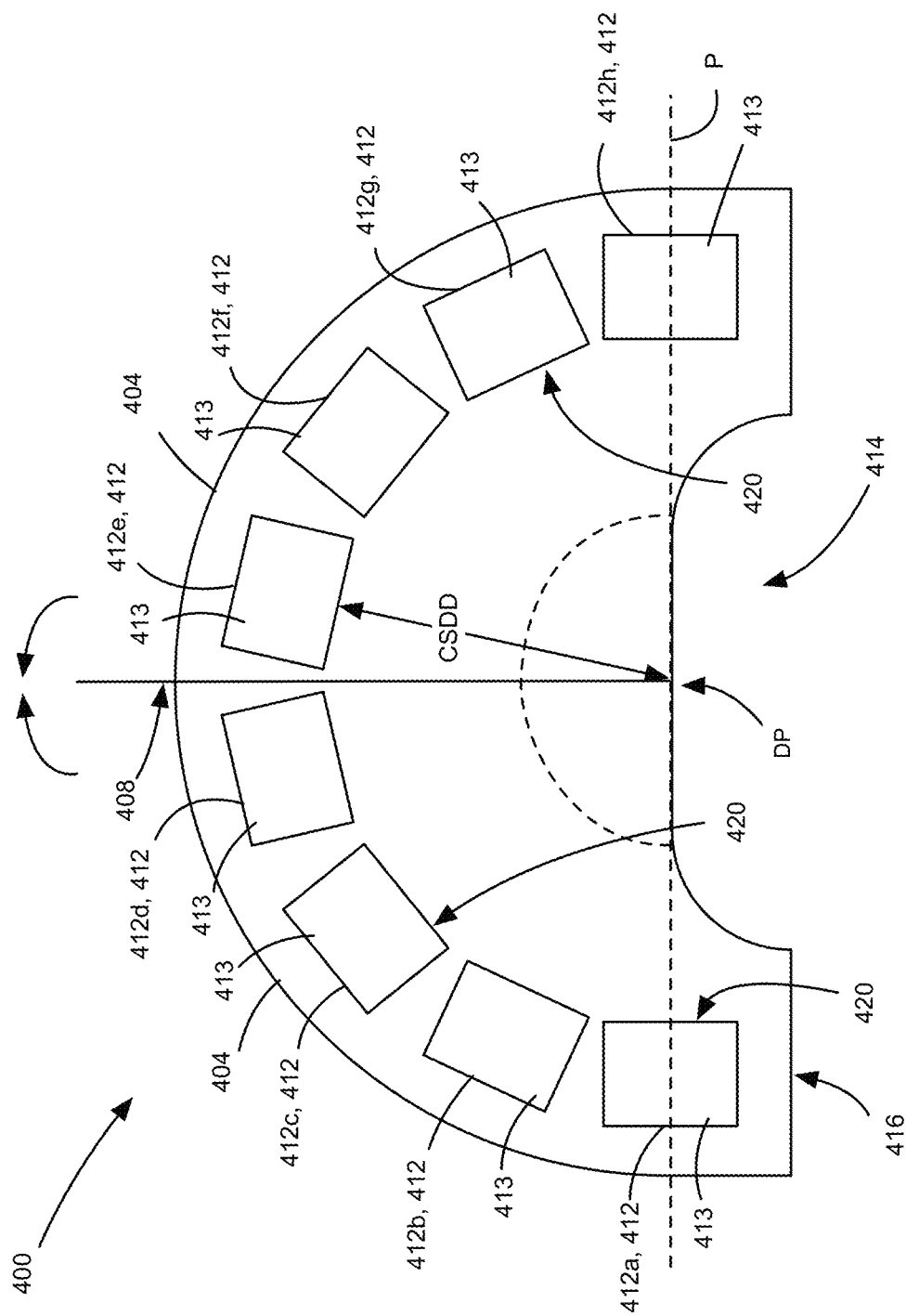
FIG. 7 shows a plan view of a hybrid card game articulating board in accordance with yet another embodiment of the disclosure.

FIG. 7 shows a hybrid card game apparatus in accordance with yet another embodiment, wherein the apparatus includes an articulating platform 400. The articulating platform 400 includes two rigid playing surface panels 404 that are connected together along a fold line 408 via hinges. These two playing surface panels 404 are shown in a use configuration, wherein a top surface of the playing surface panels 404 form a planar surface on which a card game can be played. The articulating platform 400 has a bottom surface that is configured to be securely positioned on a table or desk surface. In an alternative configuration, the articulating platform can be provided a support structure, such as legs, that can be collapsible, like those of the table shown in FIGS. 1 to 3B. Like the table 20 of FIGS. 1 to 3B, the articulating platform 400 includes a set of at least partially transparent regions in the form of plexiglass panels 412 that are distributed around a dealer position DP in a recess 414 along a dealer side edge 416 of the playing surface. The plexiglass panels 412 define card hand stations 413. A dealing distance DD between the dealer position DP and a nearest edge 420 of each of the set of card hand stations 413 is at most 36 inches in the illustrated configuration. A card sensor system is positioned near each of the set of card hand stations 413 to sense an identity of the playing cards positioned face down on the card hand station 413 and generate card identification data enabling identification of the playing cards positioned on the card hand station 413. The card sensor system is an imaging device such as a video camera positioned below the plexiglass panel 412.

The two playing surface panels 404 can be articulated about the fold line 408 towards one another to compact the width of the articulating platform 400 in a storage configuration.

While in the above-described embodiments, there is a card sensor system positioned near each of the card hand stations to sense an identity of the playing cards positioned face down on the card hand station and generate card identification data enabling identification of the playing cards positioned on the card hand station, in other embodiments, the playing surface can be configured to receive card sensor systems. In one particular embodiment, the playing surface can include at least partially transparent regions at each of the card hand stations and be configured to receive a mobile device having a camera, such as a smartphone. In this manner, any mobile device of the user's choosing can be employed with the hybrid card game apparatus. The playing surface can also include power cables for powering the card sensor systems that can be received by the playing surface. In a further embodiment, the playing surface can have recesses within which RFID readers can be positioned near the card hand stations.

Individual card sensor systems at each station can include regions of a sensor system that are associated with each card hand station. For example, a large RFID reader unit can span two or more card hand stations, and the regions of the large RFID reader unit nearest each card hand station can be associated with each card hand station.

In other embodiments, the playing surface can be made as a unitary, generally rigid playing surface or as three or more rigid sections that can articulate relative to one another or be connected to one another during deployment atop of a desk, a table, a surface support such as a set of legs, etc.

Although specific advantages have been enumerated above, various embodiments may include some, none, or all of the enumerated advantages.

Persons skilled in the art will appreciate that there are yet more alternative implementations and modifications possible, and that the above examples are only illustrations of one or more implementations. The scope, therefore, is only to be limited by the claims appended hereto and any amendments made thereto.

LIST OF REFERENCE NUMERALS 20 table
24 table top
28 distal side edge
32 dealer side edge
36 recess
40 dealer
44 card hand station
48 playing card
52 glass panel
56 table frame
58 raised edge
59 far edge
60 card sensor system
64 video camera
68 face
72 camera support
76 controller
80 network interface
84 Internet
88 computing device
92 nearest edge
96 dealer region
100 leg
104 hinge
108 top view camera support
112 top view camera
200 table
204 table top
208 recess
210 dealer side edge
212 card hand station
215 dealer
216 nearest edge
218 table top extension
220 distal outer edge
224 distal side edge
300 mat system
304 mat
308 card hand station
312 side edge
313 dealer
316 nearest edge
317 camera support base
318 camera support arm
319 camera
320 controller
324 network interface
400 articulating platform
404 playing surface panel
408 fold line
412 plexiglass panel
414 recess
416 dealer side edge
420 nearest edge
CSDD cross-surface dealing distance
DP dealer position
DRR dealer region radius
FS floor surface
MDR maximum dealing reach
PSR playing surface radius

What is claimed is:

1. A hybrid card game apparatus, comprising:
a playing surface having at least six card hand stations on which playing cards for players other than a dealer can be positioned, the at least six card hand stations being distributed around a dealer position along a side edge of the playing surface, the at least six card hand stations including a leftward card hand station and a rightward card hand station being positioned closest to or touching a plane that is parallel to the side edge of the playing surface at the dealer position on a left side and a right side respectively of a dealer when the dealer is positioned adjacent to the dealer position and facing the playing surface, wherein a distance between the dealer position and a nearest edge of each of the at least six card hand stations is at most 27 inches, further comprising at least one card sensor system positioned to sense an identity of the playing cards positioned face down on each of the at least six card hand stations and generate card identification data enabling identification of the playing cards positioned on each of the at least six card hand stations,
wherein the playing surface includes a raised rear edge adjacent to each of the at least six card hand stations and distal from the dealer position to inhibit sliding travel of the playing cards beyond the at least six card hand stations,
wherein the playing surface includes a recess in the side edge thereof for positioning of the dealer therein,
wherein the at least one card sensor system includes at least one radio-frequency identification ("RFID") reader positioned to read an RFID tag in each of the playing cards positioned on each of the at least six card hand stations, wherein the card identification data includes RFID data from the RFID tag in each of the playing cards positioned on each of the at least six card hand stations,
wherein each of the at least six card hand stations includes an at least partially transparent region in the playing surface, and wherein the at least one card sensor system further includes an imaging device for each of the at least six card hand stations, and positioned to image the playing cards positioned on the at least partially transparent region, and wherein the card identification data further includes image data generated by the imaging device,
wherein an arc length of the nearest edge of each of the at least six card hand stations is not more than 14.13".

2. The hybrid card game apparatus of claim 1, further comprising at least one network interface connected to the at least one card sensor system and configured to transmit at least one of the card identification data and an identification of the playing cards positioned on each of the at least six card hand stations generated from the card identification data over a data communications network.

3. The hybrid card game apparatus of claim 1, further comprising at least one controller connected to the at least one card sensor system of each of the at least six card hand stations and configured to recognize the identity of the playing cards positioned on each of the at least six card hand stations from the image data generated by the imaging device of each of the at least six card hand stations.

4. The hybrid card game apparatus of claim 1, further comprising at least one table top extension connectible or connected to the table top, the at least one table top extension being configurable between a collapsed configuration in which the at least one table top extension does not extend along a plane of the table top, and an extended configuration in which the at least one table top extension extends along a plane of the table top.

5. The hybrid card game apparatus of claim 1, further comprising a collapsible table support structure connectible or connected to the table top and configurable between a use configuration, in which the collapsible table support structure is connected to the table top and extends away therefrom to support the table top at an operational height relative to a floor surface, and a collapsed configuration, in which the collapsible table support structure is at least one of disconnected from the table top and does not extend away from the table top sufficiently to support the table top at the operational height.

6. The hybrid card game apparatus of claim 1, wherein the nearest edges of each of the at least six card hand stations is at least eight inches from the dealer position.

7. The hybrid card game apparatus of claim 1, wherein the at least six card hand stations are distributed in an arc extending about the dealer position.

8. The hybrid card game apparatus of claim 1, wherein the playing surface is a flexible mat.

9. The hybrid card game apparatus of claim 1, wherein the playing surface includes at least one rigid playing surface panel.

10. The hybrid card game apparatus of claim 9, wherein the at least one rigid playing surface panel can be at least two rigid playing surface panels.

11. The hybrid card game apparatus of claim 10, wherein the at least two rigid playing surface panels are connected together to enable articulation of the at least two rigid playing surface panel relative to one another.

* * * * *